United States Patent [19]
Schmidt

[11] Patent Number: 5,577,973
[45] Date of Patent: Nov. 26, 1996

[54] TWO-MODE, SPLIT POWER, ELECTRO-MECHANICAL TRANSMISSION

[75] Inventor: Michael R. Schmidt, Carmel, Ind.

[73] Assignee: General Motors Corporation, Detroit, Mich.

[21] Appl. No.: 504,979

[22] Filed: Jul. 20, 1995

[51] Int. Cl.$^6$ ....................................................... F16H 3/72
[52] U.S. Cl. ............................... 475/5; 475/323; 180/65.2
[58] Field of Search ................................. 475/5, 1, 323, 475/329, 331, 338; 180/65.2, 65.3, 69.6; 290/8, 4 C, 45, 9, 14

[56] References Cited

U.S. PATENT DOCUMENTS

| | | | |
|---|---|---|---|
| 1,786,158 | 12/1930 | Hawes | 475/331 X |
| 4,233,858 | 11/1980 | Rowlett | 475/5 |
| 4,423,794 | 1/1984 | Beck | 475/5 X |
| 5,195,600 | 3/1993 | Dorgan | 475/5 X |
| 5,285,111 | 2/1994 | Sherman | 475/5 X |
| 5,409,425 | 4/1995 | Shibahata | 475/5 O |
| 5,425,682 | 6/1995 | Hayashi | 475/5 |
| 5,489,001 | 2/1996 | Yang | 180/65.2 |

FOREIGN PATENT DOCUMENTS 1411170  7/1988  U.S.S.R. ................... 180/69.6

0624179  5/1949  United Kingdom ............ 180/65.2

*Primary Examiner*—Charles A. Marmor
*Assistant Examiner*—Peter Kwon
*Attorney, Agent, or Firm*—Donald F. Scherer

[57] ABSTRACT

An improved transmission particularly adapted for use with a constant speed engine. The transmission has an input shaft to receive power from the engine. A generator is associated with the transmission, and the generator is driven by the engine. A motor is powered by the generator. The transmission also employs a compound planetary gear set having two planetary gear sub-sets. Each planetary gear sub-set has an inner gear member and an outer gear member, each of which meshingly engage a plurality of planet gear members. One gear member of each planetary gear sub-set is conjoined. A second gear member of each planetary gear sub-set is also conjoined. The input shaft is operatively connected to one of the conjoined gear members, and the motor is operatively connected to the other of the conjoined gear members. The output shaft is operatively connected to the third gear member in the first planetary gear sub-set, and the third gear member in the second planetary gear sub-set is selectively connected to ground.

14 Claims, 2 Drawing Sheets

TWO-MODE, SPLIT POWER, ELECTRO-MECHANICAL TRANSMISSION

TECHNICAL FIELD

The present invention relates generally to vehicular transmissions. More particularly, the present invention relates to split power vehicular transmissions that selectively receive power directly from an engine and continuously from an electric motor. Specifically, the present invention relates to vehicular transmissions that incorporate a compound planetary gear set wherein one set of conjoined gear members selectively receives power from an engine, and another set of conjoined gear members in the compound planetary gear set continuously receives power from the electric motor. The third gear member in one of the planetary gear sub-sets is selectively connected to ground, and the third gear member in the other planetary gear sub-set is connected to the output of the transmission to provide two-mode operation.

BACKGROUND OF THE INVENTION

The purpose of an automobile transmission is to provide a neutral, at least one reverse and one or more forward driving ranges that impart power from an engine, and/or other power sources, to the driving wheels, as required to provide for the necessary driving force and the desired performance.

A planetary gear set consists of an inner gear member, or sun gear, an outer gear member, or ring gear, and a planetary carrier assembly which includes, and supports, a plurality of planet gear members. When the sun gear is held stationary and power is applied to the ring gear, the planet gear members rotate in response to the power applied to the ring gear and thus "walk" circumferentially about the fixed sun gear to effect rotation of the carrier assembly in the same direction as the direction in which the ring gear is being rotated.

When any two members of a planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive.

However, when the two gear members rotate in the same direction, but at different speeds, the direction in which the third gear member rotates may often be determined simply by visual analysis, but in many situations the direction will not be obvious and can only be determined by knowing the number of teeth present in the gear members of the planetary gear set.

Whenever the carrier assembly is restrained from spinning freely, and power is applied to either the sun gear or the ring gear, the planet gear members act as idlers. In that way, the driven member is rotated in the opposite direction as the drive member. Thus, in many transmission arrangements when the reverse drive range is selected, a torque transfer device serving as a brake is actuated frictionally to engage the carrier assembly and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

As those skilled in the art will appreciate, a transmission system using a power split arrangement will receive power from two sources. Utilization of one or more planetary gear sets permits two or more gear trains, or modes, by example, efficient hydrostatic units cannot accept another shaft operating concentrically through their pump and motor shafts. Therefore, a hydrostatic pump and motor will not be on the transmission centerline, but on a parallel main shaft with external gearing to transfer power from the hydrostatic unit to the centerline of the transmission. As a result, a hydrostatic pump and motor are not compatible with a compact round concentric transmission design. Furthermore, hydrostatic units that operate at greater than 5,000 psi are very noisy.

One possible solution to the aforementioned problems, is to replace the hydro-mechanical transmission with an all-electric drive transmission. However, all-electric transmission units have their own peculiar problems. In particular, the all-electric units are inefficient because engine power is transformed into electrical power to drive a motor, and that electrical power is then transformed back into mechanical, rotary power by the motor to drive the vehicle. Thus, each transformation of mechanical to electrical power, and vice versa between the engine and the drive wastes horsepower.

Accordingly, there is a need in the art for a large, horsepower transmission system with a power split that can efficiently use both electrical and mechanical input in a two-mode arrangement.

SUMMARY OF THE INVENTION

It is, therefore, a primary object of the present invention to provide a novel, high horsepower, two-mode transmission system that can efficiently use electrical and mechanical power split inputs to drive the output shaft of a transmission.

It is another object of the present invention to provide a two-mode, power split input transmission, as above, wherein the first mode is all electric and can provide forward or reverse drives at the same maximum speed, and wherein which to deliver power from the input shaft(s) of the transmission to the output shaft thereof. As such, it is well known in the art that a multi-range, power split, hydro-mechanical, or hydrostatic, transmission will utilize at least one planetary gear set. Typically, a planetary gear set will have one member connected to the power source, one member connected to the output of the transmission, and the final member of the planetary gear set will be connected to a hydrostatic drive. This is particularly advantageous because a hydrostatic drive has the same speed and torque capabilities in the reverse direction as it does in the forward direction, which is useful in military type vehicles, such as tanks and personnel carriers.

However, a transmission for a passenger vehicle, such as a bus, has somewhat different requirements. For example, a bus only requires that the maximum reverse speed be 20 percent of the maximum forward speed capacity, while still requiring that the maximum power available for the forward drive range also be available for reverse drive range.

By utilizing a hydrostatic unit in combination with a planetary gear system, an efficient, multi-range power transfer system can be developed for a passenger vehicle. The planetary gear system is very useful in combining two input power sources, such as the mechanical input received directly from an engine and the input power received from the hydrostatic drive. The efficiency of this configuration is dependent upon how much power is transferred through the hydrostatic drive. The more power that is received directly from the engine (the mechanical path), the higher the overall efficiency of the transmission. Thus, the maximum efficiency of the transmission is realized when the speed of the hydrostatic drive is zero.

As is well known to the art, there are several drawbacks in the use of hydrostatic drives in transmission systems. Typically, hydrostatic pumps and motors are not conducive to concentric and compact transmission design. For the second mode accommodates mechanical input directly from an engine, and in conjunction with the electrical input, to achieve a second forward speed range.

It is a further object of the present invention to provide a two-mode, power split input transmission, as above, in which the two power sources and the output are located on the same centerline to achieve a compact and simple transmission design.

It is still another object of the present invention to provide a two-mode, power split input transmission, as above, that operates considerably more quietly than prior art hydrostatic transmissions used for comparable purposes.

It is yet another object of the present invention to provide a two-mode, power split input transmission system, as above, that is safe, reliable and provides a cost savings when compared to other transmission systems used for comparable situations.

These and other objects of the invention, as well as the advantages thereof over existing and prior art forms, which will be apparent in view of the following detailed specification, are accomplished by means hereinafter described and claimed.

In general, a two-mode, power split input transmission embodying the concepts of the present invention utilizes a compound planetary gear set having two planetary gear sub-sets. Each planetary gear sub-set has an inner gear member and an outer gear member, each of which meshingly engage a plurality of planet gear members. The transmission is also supplied with an input shaft. Means are provided selectively to connect the input shaft to one gear member of each planetary gear sub-set.

A motor is provided for the transmission, and a torque transfer device selectively connects the motor to a second gear member of each said planetary gear sub-set. An output shaft is also presented from the transmission, and the output shaft is connected to the third gear member of the first planetary gear sub-set. A torque transfer device selectively connects the third gear member of the second planetary gear sub-set to ground.

To acquaint persons skilled in the arts most closely related to the present invention, one preferred embodiment of a two-mode, split power transmission that illustrates a best mode now contemplated for putting the invention into practice is described herein by, and with reference to, the annexed drawings that form a part of the specification. The exemplary two-mode split power transmission is described in detail without attempting to show all of the various forms and modification in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
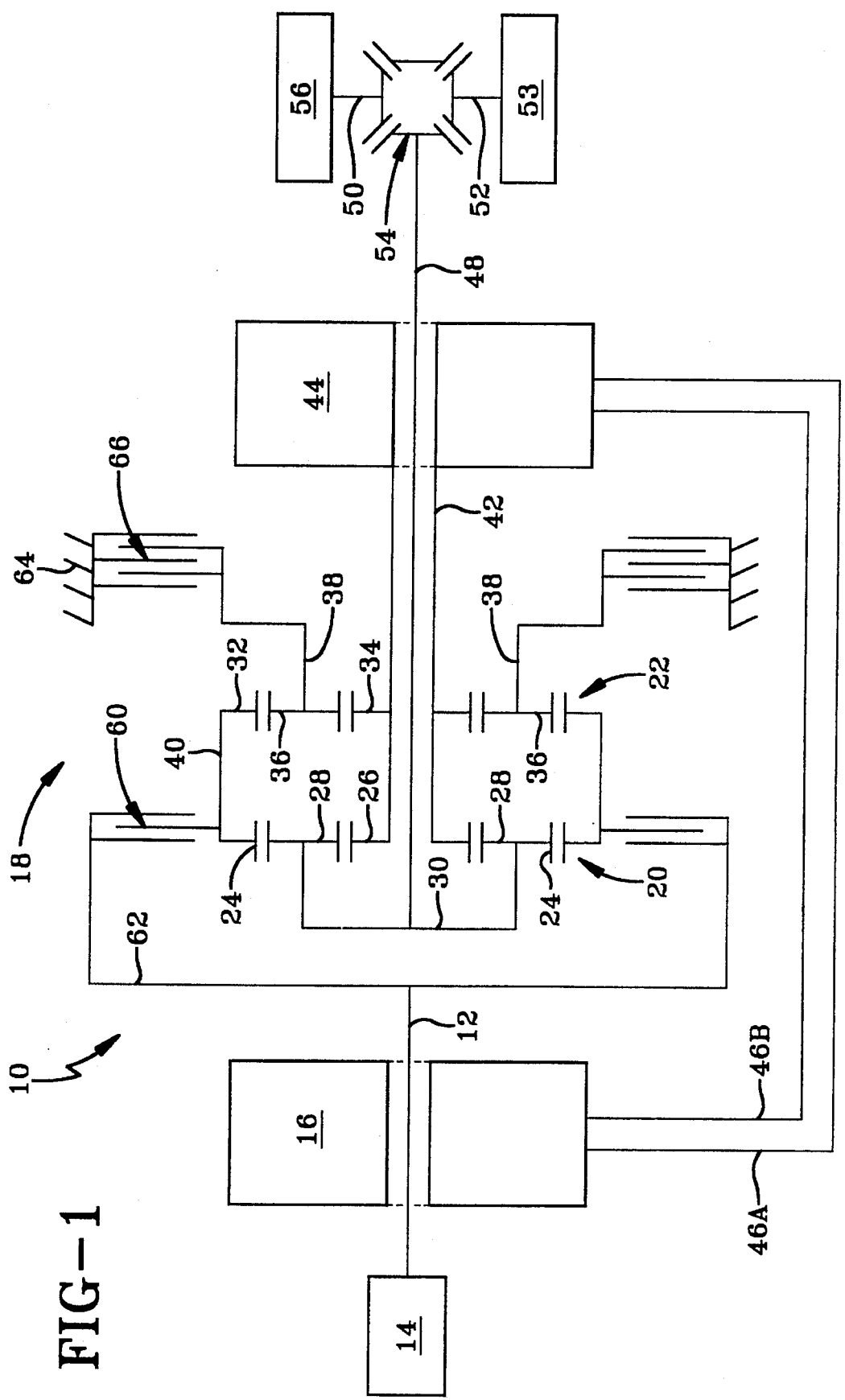
FIG. 1 is a schematic representation of the two-mode, split power transmission embodying the concepts of he present invention; and, FIG. 2 is graphical representation of the input speeds of the engine and the electric motor in relation to the operating speed of the transmission output shaft.
Figure 2:
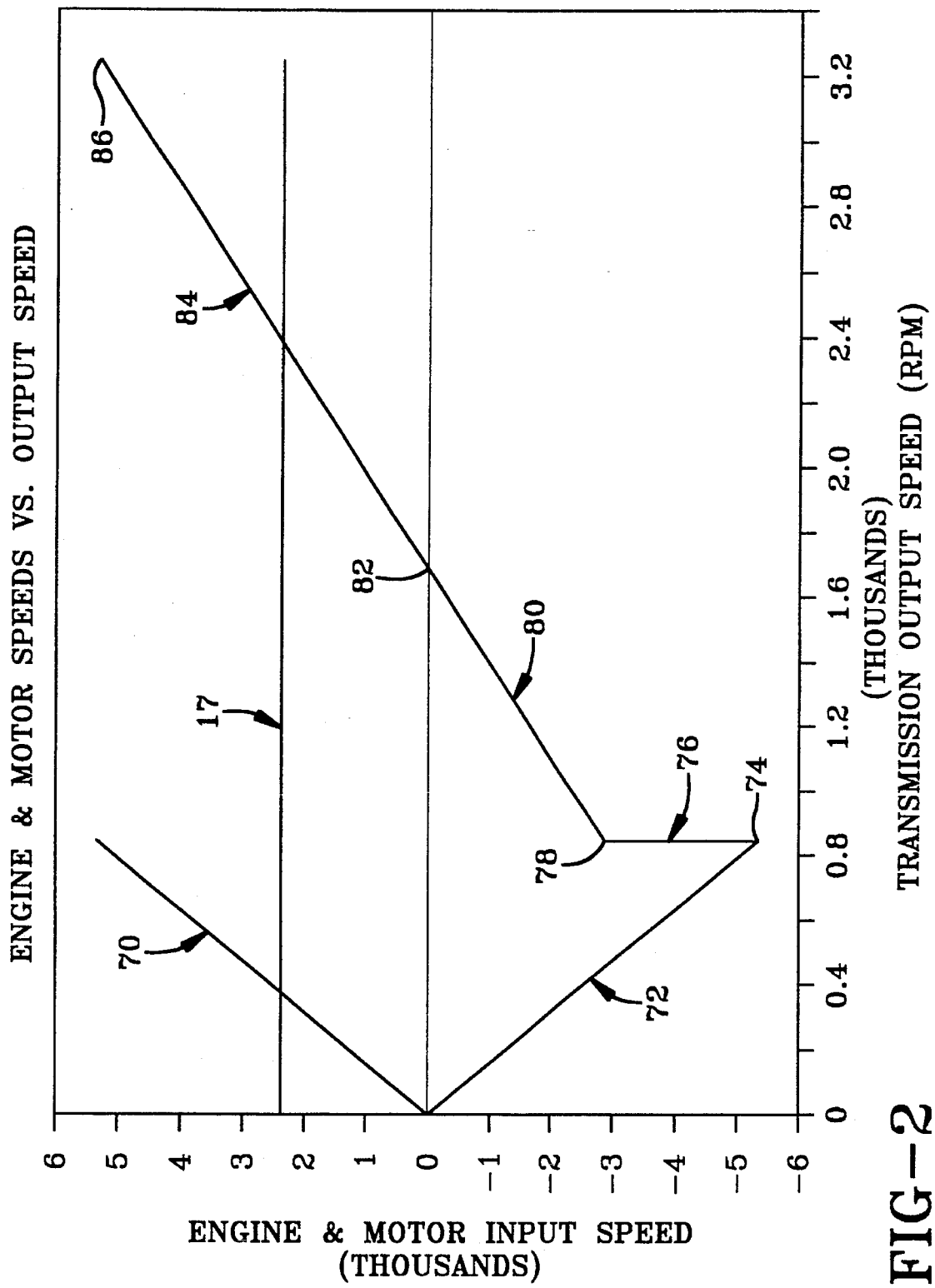

One representative form of a two-mode, split power input transmission embodying the concepts of the present invention is designated generally by the numeral 10 on the accompanying schematic drawing (FIG. 1). With reference, then, to FIG. 1, the transmission 10 has an input shaft 12 that is directly driven by an engine 14. In the embodiment depicted, the engine 14 may be a fossil fuel engine, such as a diesel engine which is readily adapted to provide its available power output delivered at a constant number of revolutions per minute (RPM). As such, a generator 16 may be driven at its most economical RPM by the engine 14, as through the input shaft 12. In an exemplary embodiment to which FIG. 2 is directed, the engine 14 can operate at a constant speed of 2400 RPM, as represented by line 17 on FIG. 2. The input shaft 12 is also selectively connected to a compound planetary gear set 18.

The compound planetary gear set 18 includes first and second planetary gear sub-sets 20 and 22. The first planetary gear sub-set 20 has an outer gear member 24, generally designated as the ring gear, which circumscribes an inner gear member 26, generally designated as the sun gear. A plurality of planet gear members 28 are rotatably mounted on a carrier 30 such that each planet gear member 28 meshingly engages both the outer gear member 24 and the inner gear member 26.

The second planetary gear sub-set 22 also has an outer gear member 32, generally designated as the ring gear, which circumscribes an inner gear member 34, generally designated as the sun gear. A plurality of planet gear members 36 are rotatably mounted on a carrier 38 such that each planet gear 36 meshingly engages both the outer gear member 32 and the inner gear member 34.

The first and second planetary gear sub-sets 20 and 22 are compounded in that the respective outer gear members 24 and 32 may be conjoined, as by ring base 40. The planetary gear sub-sets 20 and 22 are further compounded in that the inner gear members 26 and 34 may also be conjoined. As shown, the inner gear members 26 and 34 may be affixed to the annular sleeve shaft 42 that constitutes the output shaft of an electric motor 44 that is powered by the generator 16, as through electrical conductors 46A and 46B.

The carrier 30 of the first planetary gear sub-set 20 is connected to a transmission output shaft 48 that may extend concentrically within the annular motor output shaft 42 and axially through the electric motor 44. The transmission output shaft 48 drives the axles 50 and 52 through a differential 54. When the hybrid transmission 10 is used in a land vehicle, each axle 50 and 52 terminates in a respective wheel 56 and 58.

The input shaft 12 may be selectively connected to the conjoined outer gear members 24 and 32 of the respective first and second planetary gear sub-sets 20 and 22 by a first torque transfer device 60 which operates as a clutch between the ring base 40 and a transfer member 62 that is secured to the input shaft 12.

The carrier 38 of the second planetary gear sub-set 22 may be selectively connected to ground 64 through a second torque transfer device 66 which serves as a brake.

Operation of the Exemplary Preferred Embodiment

Introduction

The operator of the vehicle has three primary devices to control the hybrid transmission 10. One of the primary control devices is a well known drive range selector (not shown) that operates the transmission 10 for either the park, reverse, neutral, or forward drive range. The second and third primary control devices constitute an accelerator pedal (not shown) and a brake pedal (also not shown). The information obtained from these three primary control sources will hereinafter be referred to as the "operator demand," and a well known, on-board control device, generally in the nature of a computer, obtains the "operator demand" and then manipulates the components of the hybrid transmission 10 appropriately in response thereto.

Reverse Drive Range

For example, if the operator selects the reverse drive range, the on-board control device requires that the motor 44 rotate in a given direction. Specifically, the control device effects engagement of the torque transfer device 66 which operates as a brake to secure the carrier 38 in the second of the planetary gear sub-sets 22 against rotation. The other torque transfer device 60 remains disengaged during operation of the transmission 10 in the reverse drive range. As such, the power supplied by the engine 14 operates only the generator 16, which supplies electrical energy to the motor 44 through conductors 46.

With the carrier 38 restrained against rotation, the power supplied to the inner gear member 34 of the planetary gear sub-set 22 by electric motor 44 simply rotates the planet gears 36 to drive the outer gear member 32 in the same direction that the inner gear member 34 is rotating. The conjoined outer gear member 24 in the first planetary gear sub-set 20 rotates in the same direction as the outer gear member 32 in the second planetary gear sub-set 22. The inner gear member 26 of the first planetary gear sub-set 20 - - - being conjoined with the inner gear member 34 of the second planetary gear sub-set 22 - - - serves as the reaction member against which the planet gear members 28 rotate in response to the driving rotation of the outer gear member 24.

In a typical embodiment of the transmission 10, the outer gear members 24 and 32 of the respective planetary gear sub-sets 20 and 22 may have 117 teeth. On the other hand, the inner gear member 26 of the first planetary gear sub-set 20 may have 49 teeth, and the inner gear member 34 of the second planetary gear sub-set 22 may have 75 teeth. The direction in which the carrier 30 of the first planetary gear sub-set 20 rotates when the carrier 38 of the second planetary gear sub-set 22 is grounded is a function of the respective ratios of the teeth on the outer gear members of each compound planetary gear sub-set to the number of teeth on the inner gear member of the same compound planetary gear sub-set. In the example given, therefore, the carrier 30 will rotate in a direction opposite to the rotation of the outer gear member 24 of the first planetary gear sub-set 20. This reverse rotation of the carrier 30 effects operation within the reverse drive range for a vehicle utilizing the improved transmission 10.

The full power of the electric motor 44 is available during the reverse drive range, and the rotational speed available from the motor 44 determines the speed available in the reverse drive range. Typically, the top speed desired for the reverse drive range is approximately one-fourth (¼) of that desired for the forward drive range, and the present transmission 10 can readily accommodate such a design parameter. In fact, if the motor 44 is rotatable through a range of from zero (0) RPM to 5354 RPM it is, therefore, capable of providing approximately 835 RPM to the output shaft 48. This result is depicted as line 70 on FIG. 2.

First Mode of the Forward Drive Range

When the operator selects the forward drive range, the on-board control device initially selects operation in the first mode of the forward drive range. Operation in the first mode of the first, forward drive range requires that the motor 44 rotate in a direction opposite to that required for operation in the reverse drive range. In the first mode of the forward drive range, the control device also effects engagement of the torque transfer device 66 which operates as a brake to secure the carrier 38 in the second of the planetary gear sub-sets 22 against rotation. In the first mode of the forward drive range, the other torque transfer device 60 continues to remain disengaged. As such, the power supplied by the engine 14 operates only the generator 16, which supplies electrical energy to the motor 44 through conductors 46.

With the carrier 38 restrained against rotation, the power supplied to the inner gear member 34 of the planetary gear sub-set 22 by electric motor 44 simply rotates the planet gears 36 to drive the outer gear member 32 in the same direction that the inner gear member 34 is rotating. The conjoined outer gear member 24 in the first planetary gear sub-set 20 rotates in the same direction as the outer gear member 32 in the second planetary gear sub-set 22. The inner gear member 26 of the first planetary gear sub-set 20 - - - being conjoined with the inner gear member 34 of the second planetary gear sub-set 22 - - - serves as the reaction member against which the planet gear members 28 rotate in response to the driving rotation of the outer gear member 24.

Because the direction in which the carrier 30 of the first planetary gear sub-set 20 rotates, when the carrier 38 of the second planetary gear sub-set 22 is grounded, is a function of the respective ratios of the teeth on the outer gear members of each compound planetary gear sub-set to the number of teeth on the inner gear member of the same compound planetary gear sub-set, as explained in conjunction with operation in the reverse drive range, the carrier 30 will rotate in a direction opposite to the rotation of that same carrier 30 in the reverse drive range. This retro-rotation of the carrier 30 effects operation within the forward drive range for a vehicle utilizing the improved transmission 10.

The full power of the electric motor 44 is available during the first mode of the forward drive range, and the rotational speed available from the motor 44 determines the speed available in the first forward drive range. Hence, if the motor 44 is rotatable through a range of from zero (0) RPM to 5354 RPM it is, therefore, capable of providing approximately 835 RPM to the output shaft 48 in the forward drive range. This result is depicted as line 72 on FIG. 2.

Second Mode of the Forward Drive Range

When the rotation of the motor 44 has reached top speed, and the rotation of the output shaft 48 has reached approximately 839 RPM, as represented at point 74 on FIG. 2, the on-board control device effects a shift to the second mode of the forward drive range. The second mode of the forward drive range is effected by disengaging that torque transfer device 66 serving as a brake and substantially simultaneously engaging the other torque transfer device 60 which serves as a clutch selectively to connect the input shaft 12 to the outer gear members 24 and 32 of the respective first and second planetary gear sub-sets 20 and 22. This shift need not be synchronous, as represented by line 76 on FIG. 2. That is, as torque transfer device 66 disengages and the torque transfer device 60 engages, the constant speed operation of the engine 14, which is rotating at approximately 2400 RPM in a direction that opposes the effect of the rotation of the motor 44 on the compound planetary gear set 18, the speed of the motor is reduced to approximately 2890 RPM while maintaining the speed of the output shaft 48 at approximately 839 RPM. This condition is represented at point 78 on FIG. 2.

In the second mode of the forward drive range, the rotational speed of the output shaft 48 is increased by reducing the operational speed of the motor 44. Thus, as the rotational speed of the motor 44 is reduced from 2890 RPM to zero (0) RPM, as represented by line 80 on FIG. 2, the speed of the output shaft 48 is increased from approximately 839 RPM to approximately 1692 RPM, as represented at point 82 on FIG. 2.

At that point, the rotational direction of the motor 44 is reversed such that it will no longer oppose the rotational input from the engine 14 within the compound planetary gear set 18 but will, instead, enhance the rotational input of the engine 14. Thus, as is represented by line 84 on FIG. 2, as the speed of the motor 44 is increased from zero (0) RPM to approximately 5354 RPM in its new direction (which is the same direction utilized to effect operation in the reverse drive range), the speed of the output shaft will increase from approximately 1692 RPM to a top speed of approximately 3272 RPM, as identified at point 86 on FIG. 2.

Conclusion

While only a preferred embodiment of the present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that an electro-mechanical transmission embodying the concepts of the present invention is capable of operating in two modes with a power input split, but is also capable of accomplishing the other objects of the invention.

I claim:

1. A transmission comprising:

a compound planetary gear set having two planetary gear sub-sets;

each said planetary gear sub-sets having an inner gear member and an outer gear member, each of which meshingly engage a plurality of planet gear members;

an input shaft;

means selectively to connect said input shaft to one gear member of each said planetary gear sub-set;

a motor;

means selectively to connect said motor to a second gear member of each said planetary gear sub-set;

an output shaft;

said output shaft being connected to the third gear member of said first planetary gear sub-set; and, means selectively to connect the third gear member of said second planetary gear sub-set to ground.

2. A transmission, as set forth in claim 1, wherein:

said outer gear members of said first and second planetary gear sub-sets are conjoined; and, said input shaft is selectively connected to said conjoined outer gear members.

3. A transmission, as set forth in claim 1, further comprising:

means to conjoin said inner gear members of said first and second planetary gear sub-sets; and, said motor connected to said conjoined inner gear members.

4. A transmission, as set forth in claim 3, further comprising:

a carrier rotatably supporting said planet gear members of said first planetary gear sub-set;

said output shaft being secured to said carrier.

5. A transmission, as set forth in claim 4, further comprising:

a sleeve shaft connecting said motor to said conjoined inner gear members;

said output shaft extending substantially concentrically through said sleeve shaft.

6. A transmission, as set forth in claim 5, further comprising:

second carrier rotatably supporting said planet gear members of aid second planetary gear sub-set;

torque transfer device selectively connecting said second carrier to round.

7. A transmission, as set forth in claim 6, wherein:

said motor circumscribes said output shaft.

8. A transmission, as set forth in claim 7, wherein:

said output shaft is aligned with said input shaft.

9. An improved transmission particularly adapted for use with a constant speed engine, said transmission comprising:

an input shaft to receive power from the engine;

an output shaft;

a generator;

said generator being driven by the engine;

a motor powered by said generator;

a compound planetary gear set having two planetary gear sub-sets;

each said planetary gear sub-sets having an inner gear member and an outer gear member, each of which meshingly engage a plurality of planet gear members;

one gear member of each said planetary gear sub-set being conjoined;

a second gear member of each said planetary gear sub-sets also being conjoined;

said input shaft being operatively connected to one of said conjoined gear members;

said motor being conjoined to the other of said conjoined gear members;

said output shaft being operatively connected to the third gear member in said first planetary gear sub-set; and, the third gear member in said second planetary gear sub-set being selectively connected to ground.

10. A transmission, as set forth in claim 9, wherein:

said outer gear members of said first and second planetary gear sub-sets are conjoined; and, said inner gear members of said first and second planetary gear sub-sets are also conjoined.

11. A transmission, as set forth in claim 10, further comprising:

torque transfer means selectively to connect said input shaft to said conjoined outer gear members.

12. A transmission, as set forth in claim 11, wherein:

said motor is connected to said conjoined inner gear members.

13. A transmission, as set forth in claim 12, further comprising:

a first carrier rotatably supporting said planet gear members of said first planetary gear sub-set;

a second carrier rotatably supporting said planet gear members of said second planetary gear sub-set;

said output shaft being secured to said first carrier; and, torque transfer means selectively to connect said second carrier to ground.

14. A transmission, as set forth in claim 13, further comprising:

a sleeve shaft connecting said motor to said conjoined inner gear members;

said output shaft extending substantially concentrically through said sleeve shaft.

\* \* \* \* \*